US005345256A

United States Patent [19]

Stortz

[11] Patent Number: 5,345,256

[45] Date of Patent: Sep. 6, 1994

[54] HIGH DENSITY INTERCONNECT APPARATUS FOR AN INK JET PRINTHEAD

[75] Inventor: James L. Stortz, Spring, Tex.

[73] Assignee: Compaq Computer Corporation, Houston, Tex.

[21] Appl. No.: 20,050

[22] Filed: Feb. 19, 1993

[51] Int. Cl.$^5$ .......... G01D 15/16

[52] U.S. Cl. .......... 347/20; 439/55; 347/50; 347/68

[58] Field of Search .......... 346/140 R, 139 C; 439/55, 65, 66, 68, 74; 361/785, 791, 803

[56] References Cited

U.S. PATENT DOCUMENTS 4,628,332 12/1986 Matsumoto .......... 346/140 R 5,227,813 7/1993 Pies et al. .......... 346/140 R

FOREIGN PATENT DOCUMENTS 0183936 6/1986 European Pat. Off. .......... 439/55

*Primary Examiner*—Benjamin R. Fuller

*Assistant Examiner*—Alrick Bobb

*Attorney, Agent, or Firm*—Konneker Bush Hitt & Chwang

[57] ABSTRACT

The body of a piezoelectrically operable ink jet printhead is mounted in an upper side surface groove formed in a mounting plate member. A rear bottom section of the printhead body has an exposed top side surface portion which is flush with the top side of the mounting plate member and terminates forwardly of its rear end. A high density parallel array of mutually spaced linear conductive traces is formed on this exposed top side surface portion of the printhead body, these traces being used to transmit electrical operating signals from a separate electronic driver to piezoelectrically drivable channel sidewall sections within the interior of the printhead body. A multi-tiered printed circuit board secured to the top side of the mounting plate member is used to connect the printhead to the electronic driver. The circuit board has a series of linear traces formed on its bottom side which register with and are soldered to the closely spaced printhead body traces, a spaced series of lower density spacing contact pads formed on its top side and releasably engageable with correspondingly spaced contact pads on the electronic driver, and internal crossover circuitry that operatively connects the high density underside linear traces of the circuit board to its lower density top side contact pads.

8 Claims, 2 Drawing Sheets

HIGH DENSITY INTERCONNECT APPARATUS FOR AN INK JET PRINTHEAD

BACKGROUND OF THE INVENTION

1. Field of the Invention

The present invention generally relates to ink jet printhead apparatus and more particularly relates to apparatus for operatively interconnecting an ink jet printhead to an electrical power supply source used to control and piezoelectrically drive the printhead.

2. Description of Related Art

A piezoelectrically actuated in jet printhead is a relatively small device used to selectively eject tiny ink droplets onto a paper sheet operatively fed through a printer, in which the printhead is incorporated, to thereby form from the ejected ink droplets selected text and/or graphics on the sheet. In one representative configuration thereof, an ink jet printhead has a horizontally spaced parallel array of internal ink-receiving channels. These internal channels are covered at their front ends by a plate member through which a spaced series of small ink discharge orifices are formed. Each channel opens outwardly through a different one of the spaced orifices.

A spaced series of internal piezoelectric wall portions of the printhead body separate and laterally bound the channels along their lengths. To eject an ink droplet through a selected one of the discharge orifices, the two printhead sidewall portions that laterally bound the channel associated with the selected orifice are piezoelectrically deflected into the channel and then returned to their normal undeflected positions. The driven inward deflection of the opposite channel wall portions increases the pressure of the ink within the channel sufficiently to force a small quantity of ink, in droplet form, outwardly through the discharge orifice.

The electrical signals required to create and control the requisite printhead channel side wall deflections are typically generated by a suitable electronic driver. Due to the large number of very closely spaced ink channels present in even a small ink jet printhead structure, the resulting number of these electrical signals is quite high, while the physical area available at each ink channel for making the necessary printhead/driver connection is quite small. Accordingly, the connection of the printhead to its associated electronic driver has typically presented a significant connectivity design challenge.

One approach to this connectivity problem has been to mount the electronic driver directly on the printhead body with accompanying circuitry to eliminate the need for a large number of interconnects from the printhead structure to the overall ink jet printing system. This approach, however, undesirably results in a very substantial increase in the overall cost of the printhead structure which in many designs is a disposable unit.

Another approach to this connectivity problem has been to mount the electronic driver remotely from the printhead and provide the requisite electrical connections from the printhead channel side walls to the remotely disposed driver. One method previously proposed for providing this printhead-to-driver interconnect structure has been to form a high density, parallel array of electrically conductive surface traces on the printhead body and use a specially designed flexible ribbon connector to form the connection between these high density traces and a much lower density parallel array on a printed circuit board associated with the driver.

Under this method, the flexible connector has formed thereon a high density series of electrically conductive surface traces registrable with the traces on the printhead body, a low density series of electrically conductive surface traces registrable with corresponding traces on the driver circuit board, and a trace "fan-out" section interconnecting the high and low density connector traces. In actually forming the printhead-to-driver interconnection the high and low density trace sections on the flexible connector are respectively soldered (using a pressure/heat fellow process) to the high density trace section on the printhead body and to the low density trace section on the driver circuit board.

Despite this rather straightforward approach to electrically interconnecting the printhead to an associated electronic driver, the use of a flexible ribbon connector in this manner also greatly increases the cost associated with the overall printhead/driver system. Because of the significant pitch transition required in the flexible connector (a representative transition being from about a 3 mil pitch to about a 50 mil pitch), the cost of the specially designed flexible connector can substantially exceed the cost of the printhead structure with which it is used.

In view of the foregoing it can readily be seen that it would be desirable to provide improved high density interconnect apparatus for electrically connecting an ink jet printhead to a separate electronic driver associated therewith. It is accordingly an object of the present invention to provide such high density interconnect apparatus.

SUMMARY OF THE INVENTION

In carrying out principles of the present invention, in accordance with a preferred embodiment thereof, improved ink jet printhead apparatus is provided for removable connection to an electronic driver in an ink jet printer. The apparatus includes a piezoelectrically drivable ink jet printhead having a body with a front end section having a spaced series of ink discharge orifices extending rearwardly therethrough. A spaced, parallel series of internal sidewall sections extend rearwardly through the printhead body from its front end section and laterally bound a spaced series of internal ink receiving channels interdigitated with the sidewall sections and opening outwardly through the discharge orifices.

Each opposing pair of the sidewall sections are piezoelectrically deflectable toward one another to constrict the internal channel which they laterally bound to thereby force ink received in such channel outwardly through its associated ink discharge orifice. A rear end portion of the printhead body extends rearwardly beyond the channels and has a side surface portion.

Formed on this side surface portion is a relatively high density, mutually spaced array of electrically conductive areas which are operatively connected to the internal sidewall sections and through which piezoelectric driving signals may be transmitted to the sidewall sections to operatively deflect them.

According to a key aspect of the present invention, these electrically conductive areas, preferably a spaced, parallel series of linear traces, may be operatively coupled to a separate electronic driver within the printer by means of a multi-tiered printed circuit board fixedly secured to the printhead body.

The multi-tiered printed circuit board has a first exterior side surface positioned against the body side surface portion; a relatively high density, mutually spaced second array of electrically conductive areas formed on the first exterior side surface and being in registry with, and fixedly and conductively secured to, the first array of electrically conductive areas; a relatively low density, mutually spaced third array of electrically conductive areas, preferably electrically conductive surface pads, formed on a second exterior side surface of the printed circuit board; and a mutually spaced series of electrically conductive crossover circuit paths formed within the interior of the printed circuit board and operatively interconnecting the second and third arrays of electrically conductive areas.

The third array of electrically conductive areas may be releasably brought into contact with similarly spaced electrically conductive connector areas on the electronic driver to thereby electrically connect the printhead body internal sidewall sections to the electronic driver. The multi-tiered printed circuit board thus functions as a compact high density-to-low density interconnect device, carried by the printhead body, for coupling the electronic driver to the printhead.

The printhead body is preferably carried within a top side surface groove of a mounting plate member, with the aforementioned surface portion of the printhead body, on which the first array of electrically conductive areas are formed, being essentially flush with the first exterior side surface of the multi-tiered printed circuit board, and the printed circuit board extending along such first exterior side surface of the mounting plate member.

DETAILED DESCRIPTION

Figure 1:
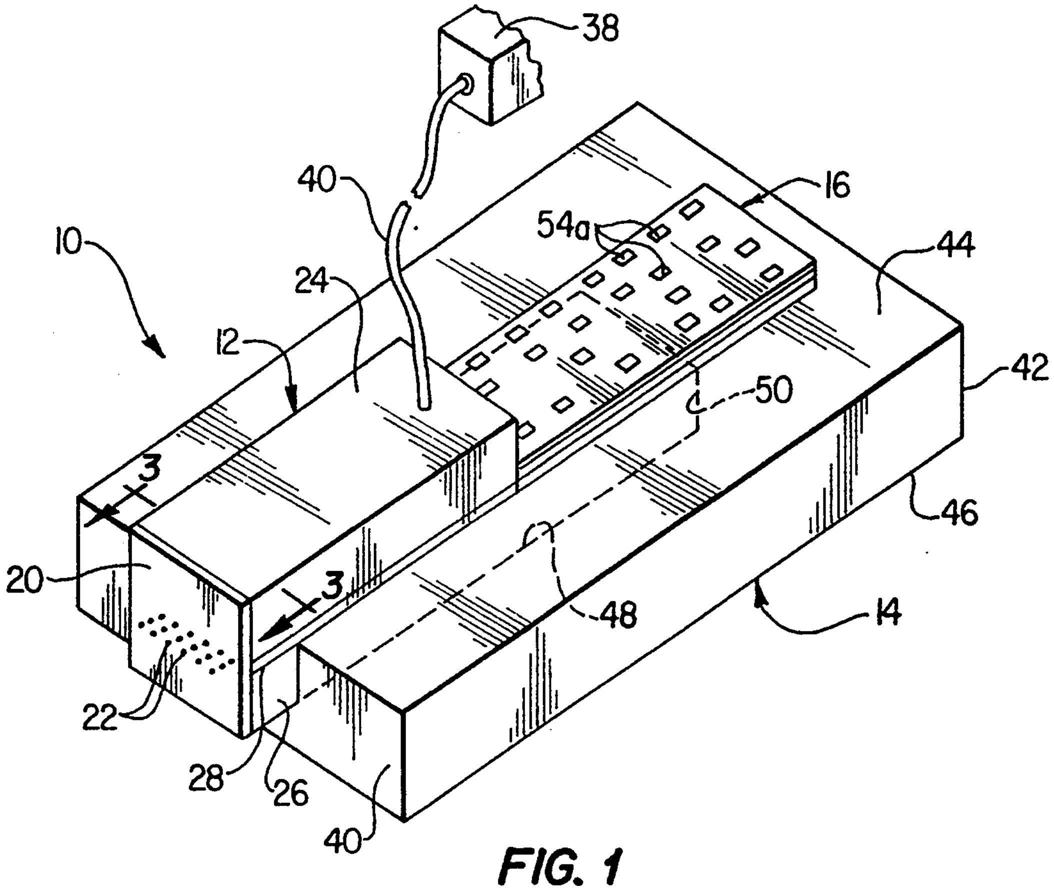
FIG. 1 is a simplified, somewhat schematic perspective view of an ink jet printhead structure, and associated high density remote driver interconnect apparatus, embodying principles of the present invention.
Figure 2:
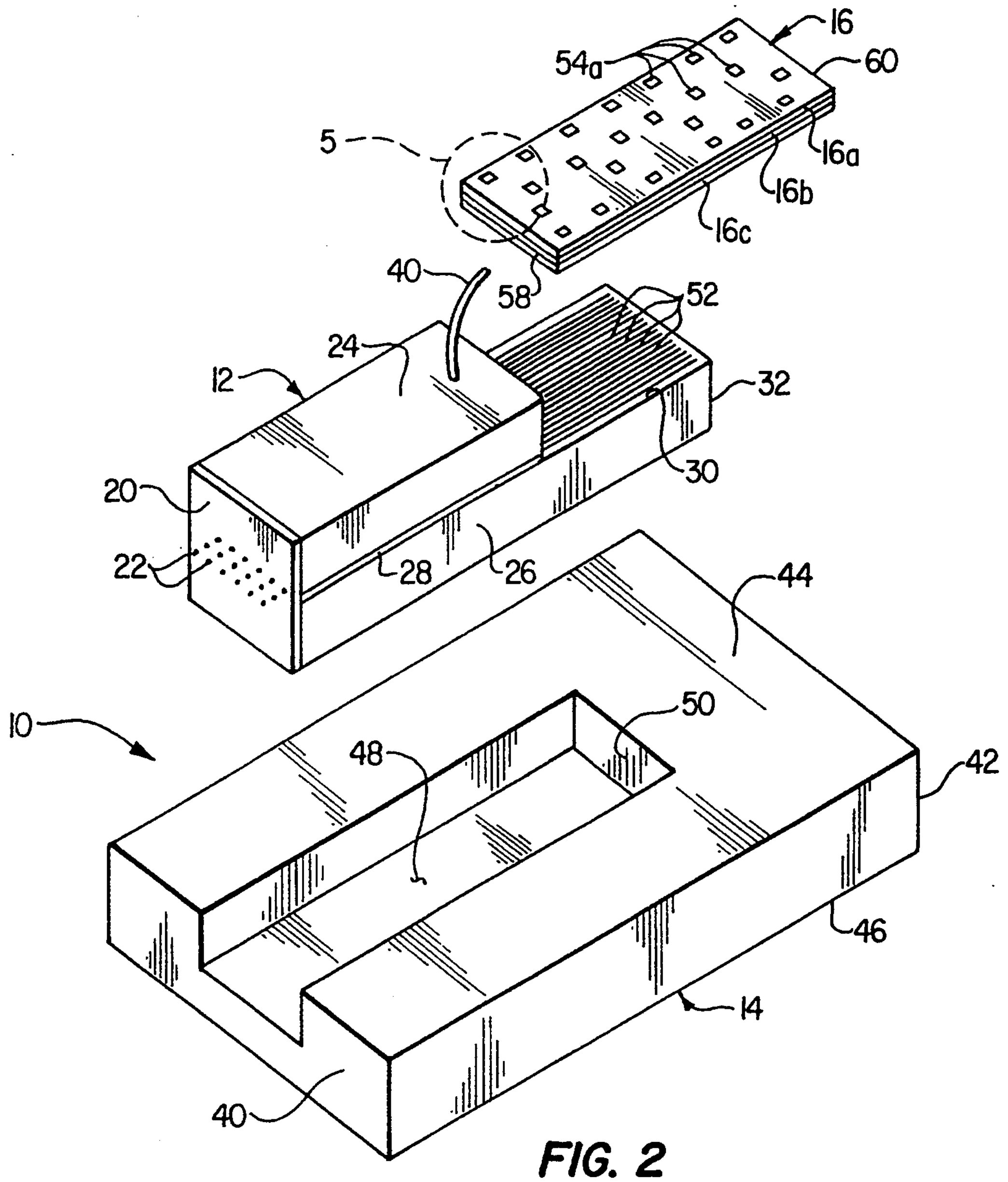
FIG. 2 is an exploded perspective view of the printhead and interconnect apparatus.

Perspectively illustrated in FIGS. 1 and 2 is a specially designed ink jet printhead structure 10 embodying principles of the present invention and including a printhead 12, a mounting plate member 14, and a multi-tiered printed circuit board 16 used to electrically connect the printhead 12 to an electronic driver 18 (schematically depicted in FIG. 6) in a manner subsequently described.

A left or front end section of the printhead 12 is defined by a rectangular orifice plate 20 that is preferably formed from a nonpiezoelectric ceramic material. Extending rearwardly through the plate 20 are a horizontally spaced series of small ink discharge orifices 22. As illustrated, the orifices 22 are grouped in horizontally successive, vertically sloped sets.

Secured to the rear side of the orifice plate 20, and extending rearwardly therefrom, are three intersecured, rectangularly configured printhead body sections, a top section 24, a bottom section 26, and a vertically intermediate section 28 sandwiched between the top and bottom sections. As illustrated in FIGS. 1 and 2, the top and bottom body sections 24,26 are substantially thicker than the intermediate body section 28, the widths of the three body sections are identical, the sections 24,28 rearwardly terminate in essentially the same vertical plane, and the bottom body section 26 extends rearwardly beyond the back ends of the sections 24,28 and has an exposed top side surface portion 30 and a rear end 32.

The top and bottom body sections 24,26 are preferably formed from a nonpolled ceramic material, although section 26 could be formed from a polled material if desired, and the vertically intermediate body section 28 is formed from a piezoelectrically active ceramic material suitably polled in a horizontal direction. As cross-sectionally illustrated in FIG. 3, prior to the aligned intersecurement of the three printhead body sections a series of vertical grooves of predetermined width and depth are appropriately formed in the sections in a manner such that in the assembled printhead the grooves are horizontally aligned to form within the printhead body a horizontally spaced series of parallel interior channels 34.

The horizontally spaced channels 34 longitudinally extend rearwardly from the orifice plate 20, with the front end of each of the channels opening outwardly through one of the ink discharge orifices 22. Each of the channels 34 is laterally bounded along its front-to-rear length by an opposed pair of a series of internal actuator sidewall sections 36. As illustrated, each actuator sidewall section 36 is defined by vertically stacked portions of the printhead body sections 24,26,28. At their rear ends, the channels 34 communicate with an ink manifold chamber (not shown) formed within the interior of the printhead body. The manifold chamber is communicated with, and receives a supply of ink from, a suitable external ink supply vessel 38 (see FIG. 1) via a flexible ink delivery tube 40.

The mounting plate member 14 is preferably formed from a metal material, such as aluminum, and has a front end 40, a rear end 42, a top side 44 and a bottom side 46. An elongated, rectangularly cross-sectioned groove 48 is formed in the top side 44 of the mounting plate member 14 and longitudinally extends rearwardly from its front end 40, the groove 48 having a rear end surface 50 spaced forwardly apart from the rear end 42 of the mounting plate member. The front-to-rear length of the groove 48 is somewhat shorter than the corresponding length of the bottom printhead body section 26, the horizontal width of the groove 48 is just slightly greater than the corresponding width of the body section 26, and the vertical height of the groove 48 is essentially identical to that of the printhead body section 26.

Figure 6:
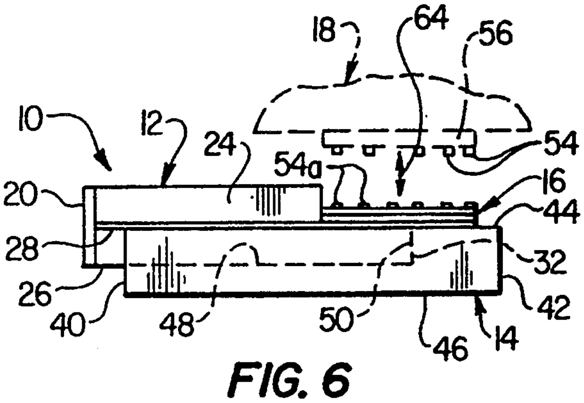
FIG. 6 is a highly schematic side elevational view of the printhead illustrating the manner in which it may be operatively connected to a remotely mounted electronic driver.

As shown in FIGS. 1 and 6, the bottom printhead body section 26 is downwardly received, and suitably secured, within the groove 48 with the rear end 32 of body section 26 abutting the rear end surface 50 of the groove 48. Accordingly, the orifice plate 20 is forwardly spaced apart from the front end 40 of the mounting plate member 14, and the top side surface 30 (FIG. 2) of the bottom printhead body section 26 is essentially flush with the exposed top side surface 44 of the mounting plate member 14.

Figure 3:
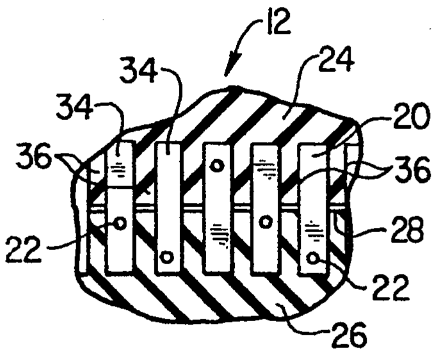
FIG. 3 is an enlarged scale partial cross-sectional view through the printhead taken along line 3—3 of FIG. 1.

Referring now to FIGS. 2 and 3, the operative discharge of ink droplets from any selected one of the interior printhead body channels 34, via its associated orifice 22, is effected by imposing electrical driving voltages on the opposing actuator sidewall sections 36 (see FIG. 3) that bound such channel. In a unique manner subsequently described, these driving voltages are transmitted to the actuator sidewall sections 36 (from the previously mentioned electronic driver 18 schematically shown in phantom in FIG. 6) via a series of mutually spaced, parallel electrically conductive surface traces 52 (see FIG. 2) formed on the exposed top side surface portion 30 of the bottom printhead body section 26.

The parallel surface traces 52 longitudinally extend in a front-to-rear direction along the exposed top side surface 30 of the bottom printhead body section 26, with the spaced apart front ends of the traces 52 being electrically connected to the similarly spaced segments of the piezoelectrically active printhead body section 28 that form vertically intermediate portions of the actuator sidewall sections 36.

To discharge an ink droplet from a selected one of the channels 34, opposite polarity voltages are transmitted, from the electronic driver 18 to the opposed actuator sidewall sections 36 that laterally bound the channel, through the appropriate pair of surface traces 52. This causes the opposed pair of actuator sidewall actuator sections 36 to laterally deflect away from one another. The voltages are then reversed which causes the sidewall actuator sections to deflect toward one another, thereby forcing ink in droplet form outwardly through the selected orifice 22. Finally, a ground potential is applied to the sidewall actuator sections to cause them to return to their rest (i.e., undeflected) positions.

Due to the very small horizontal widths of the channels 34 and the actuator sidewall sections 36 which separate them from one another, the spacing between the parallel surface traces 52 is also quite small, representatively on the order of about 3 mils. The connective interface formed on the printhead 12 by the surface traces 52 is thus referred to as having a high density or pitch.

The connective interface on the separate electronic driver 18 (see FIG. 6) is of a considerably lower density (representatively on the order of about 50 mils) and is defined by a spaced series of electrically conductive surface pads 54*a* formed on the underside of a printed circuit board 56 forming a connection portion of the electronic driver 18.

According to a key aspect of the present invention, the operative connection between the high density surface traces 52 (FIG. 2) on the printhead 12 and the much lower density pads 54 on the driver circuit board 56 (FIG. 6) is releasably effected using the printed circuit board 16 (FIGS. 1 and 6) carried by the printhead 12.

Referring now to FIGS. 1, 2, 4 and 5, the printed circuit board 16 has an elongated rectangular configuration, a front-to-rear length substantially longer than that of the exposed top side surface portion 30 of the printhead body section 26, a width substantially identical to that of the surface portion 30, a front end 58, and a rear end 60. Printed circuit board 16 is of a multi-tier construction and, for purposes of illustration and discussion, is shown as representatively having, from top to bottom, three layers 16*a*,16*b* and 16*c* although it could have a much larger number of such layers.

Figure 4:
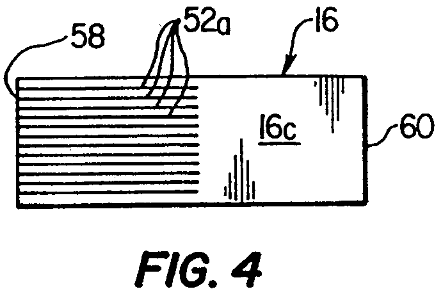
FIG. 4 is a bottom plan view of the a multi-tiered printed circuit board portion of the interconnect apparatus.

Formed on the underside of the bottom layer 16*c* (see FIG. 4) are a series of spaced apart, parallel electrically conductive surface traces 52*a* that longitudinally extend parallel to the length of the circuit board and have the same widths, lengths and pitch spacing as the surface traces 52 (see FIG. 2) on the exposed top side surface portion 30 on the printhead body. As best illustrated in FIG. 4, each of the traces 52*a* begins adjacent the front end 58 of the circuit board and ends a substantial distance forwardly of the rear end 60 of the circuit board 16. Accordingly, as later described, the trace sets 52,52*a* may be brought into precise registration with one another by placing a front underside portion of the circuit board 16 atop the exposed top side surface portion 30 of the printhead body section 26, in lateral alignment therewith, with the front end 58 of the circuit board 16 positioned against the rear end of the printhead body section 24.

The top side of the upper circuit board layer 16*a* has formed thereon a spaced series of electrically conductive surface pads 54*a* that have a pitch spacing (representatively about 50 mils) substantially greater than the pitch spacing of the linear surface traces 52,52*a*. The surface pads 54*a* are oriented on the circuit board layer 16*a* in a manner such that they may be brought into precise alignment with the surface pads 54 on the electronic driver circuit board 56. Unlike the surface traces 52*a*, which extend along only a front underside portion of the circuit board 16, the surface pads 54*a* are positioned in a spaced apart orientation that extends over essentially the entire top side surface area of the circuit board 16.

Figure 5:
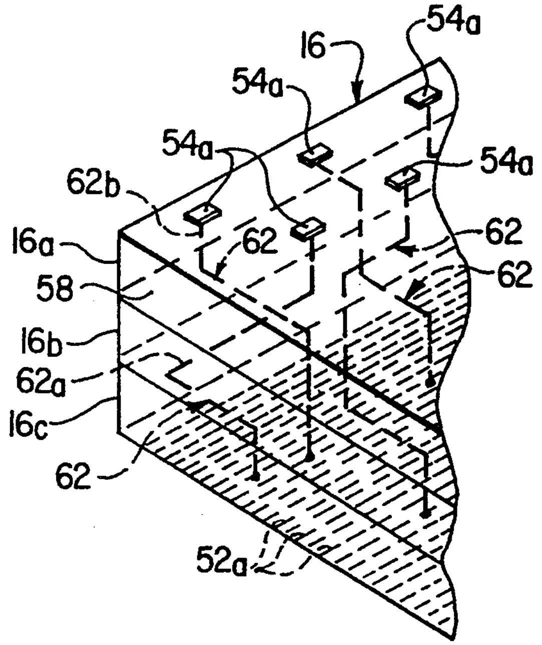
FIG. 5 is an enlarged scale perspective view of a corner portion of the multi-tiered circuit board showing, in highly schematic form, representative internal cross-over routings between high and low density side surface connector portions thereof.

As best illustrated in FIG. 5, the surface pads 54*a* on the top side of the circuit board 16 are operatively interconnected with the linear surface traces 52*a* on the bottom side of the circuit board 16 by means of a series of electrical crossover circuit paths 62 within the interior of the circuit board 16. The circuit paths 62 representatively have horizontal portions 62*a* extending along the top side surfaces of the circuit board layers 16*a*,16*b* and 16*c*, and vertical "via" portions 62*b* extending vertically through such layers.

Accordingly, the crossover paths 62 constitute means for transitioning from the high density bottom side connection area defined by the linear traces 52*a* to the lower density top side connection area defined by the surface pads 54*a*, this expansion from high to low connection area densities taking place longitudinally along the printed circuit board 16.

In fabricating the printhead structure 10, the printhead body section 26 is placed in the mounting plate groove 48, and secured to the mounting plate member, as previously described. The circuit board 16 is then placed atop the printhead body surface 30 and the top side 44 of the mounting plate member 14, as shown in FIG. 1, with the facing linear surface traces 52,52*a* in precisely registered contact with one another. The contacting surface trace sets 52,52*a* are then soldered to one another, preferably using a pressure/heat reflow process, thereby electrically connecting the surface traces 52 to the top side surface pads 54*a*. Alternatively, an electrically conductive adhesive material could be used to electrically connect the trace sets **52,52*a*** to one another.

The printhead structure 10 may then be operably and releasably connected to the separate electronic driver 18 (see FIG. 6) simply by appropriately bringing the printhead structure surface pads **54*a* into releasable contact with the identically arranged contact pads 54 on the driver circuit board 56 as indicated by the double-ended arrow 64 in FIG. 6**.

The use of the multi-tiered printed circuit board 16 to effect the necessary high density-to-low density connection interface between the printhead 12 and the electronic driver 18 provides the printhead structure 10 with several advantages. First, because the driver 18 is separately mounted within the overall printer structure, and not permanently secured to the printhead, the overall fabrication cost of the printhead 12, and thus its replacement cost, is substantially reduced.

Second, as opposed to the use of a flexible ribbon connector to provide the high density-to-low density connection spacing conversion between the printhead and driver, the use of the multi-tiered printed circuit board 16 further reduces the overall fabrication cost of the printhead 12.

Third, as best illustrated in FIG. 2, the horizontal width of the array of linear surface traces 52 on the printhead body is only slightly less than the horizontal width of the printhead body. Accordingly, if a flexible ribbon connector was used to provide a high density-to-low density connection interface between the printhead and its associated electronic driver, the low density end of the ribbon connector would have to be considerably wider than the printhead body since the only direction for pitch expansion on the flexible ribbon connector would be along its width.

However, by using the illustrated multi-tier printed circuit board 16 instead, the width of this interconnect portion of the printhead structure need not exceed the width of the printhead body. Thus, the maximum width of the printhead is correspondingly reduced. This permits several printheads to be grouped in a close side-by-side relationship if desired.

Fourth, compared to using a flexible ribbon connector, the use of the multi-tiered printed circuit board 16 provides the printhead 12 with a more rugged construction and facilitates the connection of the printhead to its associated driver. In this regard it should be noted that the mounting plate member 14, which underlies a rear end portion of the circuit board 16, serves not only to conveniently support the printhead 12 and facilitate its handling, but also functions to brace the circuit board 16 when it is operatively pressed into contact with the driver circuit board 56.

The foregoing detailed description is to be clearly understood as being given by way of illustration and example only, the spirit and scope of the present invention being limited solely by the appended claims.

What is claimed is:

1. Ink jet printhead apparatus removably connectable to an electronic driver operative to output piezoelectric driving signals through a spaced series of electrically conductive exterior side surface areas disposed thereon, said ink jet printhead apparatus comprising:

a mounting plate member having top and bottom side surfaces, front end edge surface and rear end edge surface opposite side edge surfaces extending between said front nd edge surface and said rear end edge surface, and an elongated top side surface groove disposed between said opposite side edge surfaces and longitudinally extending rearwardly from said front end edge surface to a rear end location spaced forwardly of said rear end edge surface;

an ink jet printhead having a body received in said groove and secured to said mounting plate member, said body having a front-to-rear length and further having:

a front end section with a spaced series of ink discharge orifices extending rearwardly therethrough, said front end section being adjacent said front end edge surface of said mounting plate member, a spaced, parallel series of internal sidewall sections extending rearwardly through a longitudinally intermediate portion of said body from said front end section and laterally bounding a spaced series of internal ink receiving channels interdigitated with said sidewall sections and opening outwardly through said discharge orifices, an opposing pair of said sidewall sections being piezoelectrically deflectable toward one another to constrict a channel which the opposing pair of said sidewall sections laterally bound to thereby force ink received in said channel outwardly through one of said ink discharge orifices, a rear end portion extending rearwardly beyond said longitudinally intermediate portion of said body, toward the rear end of said groove, and having an upper side surface essentially flush with said top side of said mounting plate member, and a mutually spaced first array of electrically conductive areas, formed on said upper side surface and operatively connected to said internal sidewall sections, through which piezoelectric driving signals are transmitted to said internal sidewall sections, said first array of electrically conductive areas having a first spacing density; and a multi-tiered printed circuit board secured to said top side of said mounting plate member and having:

a bottom side surface having a first portion positioned against said upper side surface of said printhead body, and a second portion extending along and positioned against said top side of said mounting plate member, and a top side surface, a mutually spaced second array of electrically conductive areas formed on said first portion of said bottom side surface of said printed circuit board, said second array of electrically conductive areas being in registery with and fixedly and conductively secured to, said first array of electrically conductive areas, a mutually spaced third array of electrically conductive areas formed on said top side surface of said printed circuit board, said third array of electrically conductive areas having a second spacing density less than said first spacing density, and a mutually spaced series of electrically conductive crossover circuit paths formed within an interior of said printed circuit board and operatively interconnecting said second and said third array of electrically conductive areas, said mounting plate member being movable toward and away from the electronic driver in a manner respectively engaging said third array of electrically conductive areas with said electrically conductive exterior surface areas on the electronic driver and disengaging said third array of electrically conductive areas from said electrically conductive exterior surface areas on the electronic driver.

2. The ink jet printhead apparatus of claim 1 wherein: each of said first and said second array of electrically conductive areas is defined by a mutually spaced, parallel series of electrically conductive linear surface traces.

3. The ink jet printhead apparatus of claim 1 wherein: said third array of electrically conductive areas is defined by a mutually spaced series of electrically conductive pads.

4. The ink jet printhead apparatus of claim 1 wherein: each of said first and said second array of electrically conductive areas is defined by a mutually spaced, parallel series of electrically conductive linear surface traces, and said third array of electrically conductive areas is defined by a mutually spaced series of electrically conductive pads.

5. The ink jet printhead apparatus of claim 1 wherein: said first and said second array of electrically conductive areas are soldered to one another.

6. The ink jet printhead apparatus of claim 1 wherein: said upper side surface of said body has a width extending transversely to the front-to-rear length of said body, and said printed circuit board has a width substantially identical to the width of said upper side surface of said body, is aligned in a widthwise manner with said upper side surface of said body, and extends rearwardly beyond said body along said top side of said mounting plate member.

7. The ink jet printhead apparatus of claim 6 wherein: said upper side surface of said body is downwardly inset from a section of said longitudinally intermediate portion of said body.

8. The ink jet printhead apparatus of claim 1 wherein: said front end section of said printhead body is positioned forwardly of said front end edge surface of said mounting plate member.

* * * * *